United States Patent
Huang et al.

(10) Patent No.: US 9,589,024 B2
(45) Date of Patent: Mar. 7, 2017

(54) MECHANISM FOR FACILITATING DYNAMIC AND PROACTIVE DATA MANAGEMENT FOR COMPUTING DEVICES

(71) Applicant: INTEL CORPORATION, Santa Clara, CA (US)

(72) Inventors: Yicong Huang, Beijing (CN); Kingsum Chow, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 321 days.

(21) Appl. No.: 14/129,962

(22) PCT Filed: Sep. 27, 2013

(86) PCT No.: PCT/CN2013/084431
§ 371 (c)(1),
(2) Date: Dec. 28, 2013

(87) PCT Pub. No.: WO2015/042860
PCT Pub. Date: Apr. 2, 2015

(65) Prior Publication Data
US 2015/0220528 A1    Aug. 6, 2015

(51) Int. Cl.
G06F 17/30    (2006.01)

(52) U.S. Cl.
CPC ...... *G06F 17/3053* (2013.01); *G06F 17/3007* (2013.01); *G06F 17/30132* (2013.01);
(Continued)

(58) Field of Classification Search
CPC ........... G06F 17/3007; G06F 17/30868; G06F 17/30963; G06F 17/30583; G06F 17/30132;
(Continued)

(56) References Cited

U.S. PATENT DOCUMENTS

2004/0037424 A1*    2/2004    Numao ............... H04L 9/083
                                                     380/277
2011/0282856 A1*    11/2011    Ganti ............... G06F 17/30684
                                                     707/706
(Continued)

FOREIGN PATENT DOCUMENTS

CA    2757771 A1    10/2010
CN    102385576 A    3/2012

OTHER PUBLICATIONS

CA 2757771 A1—"Similarity based feature set supplementation for classifycation" by Yu et al., publication date Oct. 14, 2010, tranlated from Chinese to English ,9 pages.*
(Continued)

*Primary Examiner* — Rehana Perveen
*Assistant Examiner* — Ttiffany Huy Bui
(74) *Attorney, Agent, or Firm* — Blakely, Sokoloff, Taylor & Zafman LLP (57) ABSTRACT

A mechanism is described for facilitating dynamic data management for computing devices according to one embodiment. A method of embodiments, as described herein, includes tracking one or more factors relating to a plurality of data sets, evaluating the plurality of data sets based on the one or more factors. The evaluating may include speculating at least one of relevancy and accessibility of each of the plurality of data sets. The method may further include generating data scores, the data scores being associated with the plurality of data sets based on the evaluation of the plurality of data sets, performing a first comparison of the data scores of the plurality of data sets with a criteria score, and classifying each data set based on the first comparison. The classifying may include setting caching order for each data set of the plurality of data sets.

19 Claims, 4 Drawing Sheets

(52) U.S. Cl.
CPC .. *G06F 17/30598* (2013.01); *G06F 17/30864* (2013.01); *G06F 17/30943* (2013.01)

(58) Field of Classification Search
CPC ......... G06F 17/30598; G06F 17/30864; G06F 17/30943
USPC ........................................................ 707/728
See application file for complete search history.

(56) References Cited

U.S. PATENT DOCUMENTS

| | | | |
|---|---|---|---|
| 2011/0282860 A1 | 11/2011 | Baarman et al. | |
| 2014/0019539 A1* | 1/2014 | Novak ................... | G06Q 50/01 709/204 |
| 2014/0258205 A1* | 9/2014 | Clark ....................... | G06N 5/02 706/46 |
| 2015/0154630 A1* | 6/2015 | Hensel ............... | G06Q 30/0239 705/14.39 |

OTHER PUBLICATIONS

CN 102385576 A—"Method and system for counting influence of Bloger" by Wang et al., publication date Mar. 21, 212, translated from Chinese to English, 8 pages.*
PCT/CN2013/084431, "Notification of Transmittal of the International Search Report and the Written Opinion of the International Searching Authority, or the Declaration" mailed Jul. 8, 2014, pp. 12.

* cited by examiner

MECHANISM FOR FACILITATING DYNAMIC AND PROACTIVE DATA MANAGEMENT FOR COMPUTING DEVICES

CROSS-REFERENCE TO RELATED APPLICATION

This patent application is a U.S. National Phase Application under 35 U.S.C. §371 of International Application No. PCT/CN2013/084431, filed Sep. 27, 2013, entitled MECHANISM FOR FACILITATING DYNAMIC AND PROACTIVE DATA MANAGEMENT FOR COMPUTING DEVICES by Yicong, HUANG, et al., the benefit and priority are claimed thereof and the entire contents of which are incorporated herein by reference.

FIELD

Embodiments described herein generally relate to computer programming More particularly, embodiments relate to a mechanism for facilitating dynamic and proactive data management for computing devices.

BACKGROUND

With the rapid growth and use of data, such as Customer Relationship Management (CRM) data uses by businesses, the large data is becoming increasingly difficult to manage. Most conventional data management techniques are costly as they require expensive hardware upgrades, such as computer nodes and networking equipment, and yet such techniques continue to be inefficient, unintelligent, and error-prone.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for proactively managing big data and speculating/predicting high and low hit data sets as determined from historical data context and usage tracking for improving the use of cache and data access time as well as significantly minimizing the overhead typically associated with growing data sizes. Most data accessed by the user is short-lived, such as data provided through social networking websites (e.g., Facebook®, Twitter®, etc.) may include continuous flow of news items/updates that replace older items which then quickly fade away and lose the user's interest. In one embodiment, using garbage collection and knowledge discovery processes, these older or out-of-date data items are identified and swept away through garbage collection, while the newer and frequently-accessed data items are put in top generation by knowledge discovery for immediate and easy access to enhance the user's data accessing experience. It is contemplated that most big data-related problems may be with the cache at a computing device and the big data may be beyond the capabilities of common relational database systems and distributed file systems, such as Apache®'s Hadoop Distributed File System (HDFS™), HBase™, Hive™, etc., used for storing unstructured or semi-structured data. In one embodiment, data management may be performed using garbage collection and knowledge discovery processes without having to require any overhead or loss of data or the like.

Figure 1:
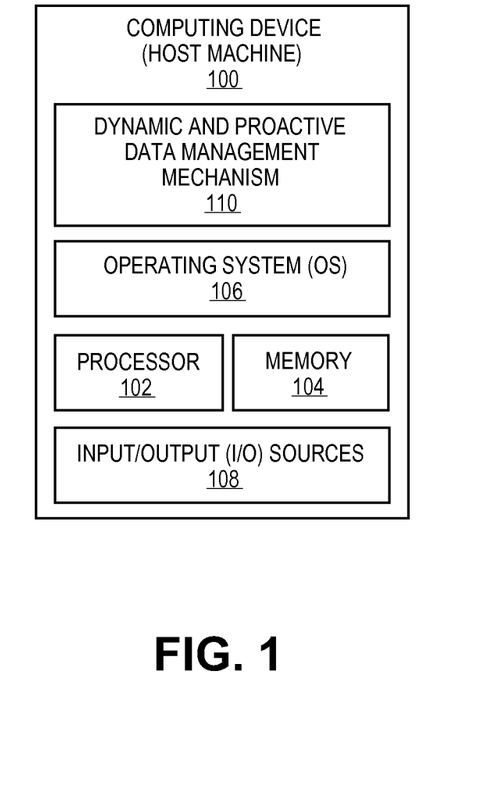
FIG. 1 illustrates a dynamic and proactive data management mechanism employed at a computing device according to one embodiment.

FIG. 1 illustrates a dynamic and proactive data management mechanism 110 employed at a computing device 100 according to one embodiment. Computing device 100 serves as a host machine for facilitating dynamic storage management for computing devices ("storage management mechanism"). Computing device 100 may include mobile computing devices, such as cellular phones including smartphones (e.g., iPhone® by Apple®, BlackBerry® by Research in Motion®, etc.), personal digital assistants (PDAs), tablet computers (e.g., iPad® by Apple®, Galaxy 3® by Samsung®, etc.), laptop computers (e.g., notebook, netbook, Ultrabook™, etc.), e-readers (e.g., Kindle® by Amazon®, Nook® by Barnes and Nobles®, etc.), etc. Computing device 100 may further include set-top boxes (e.g., Internet-based cable television set-top boxes, etc.), and larger computing devices, such as desktop computers, server computers, etc.

Computing device 100 includes an operating system (OS) 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", and "software package" may be used interchangeably throughout this document. Similarly, terms like "job", "input", "request" and "message" may be used interchangeably throughout this document.

Figure 2:
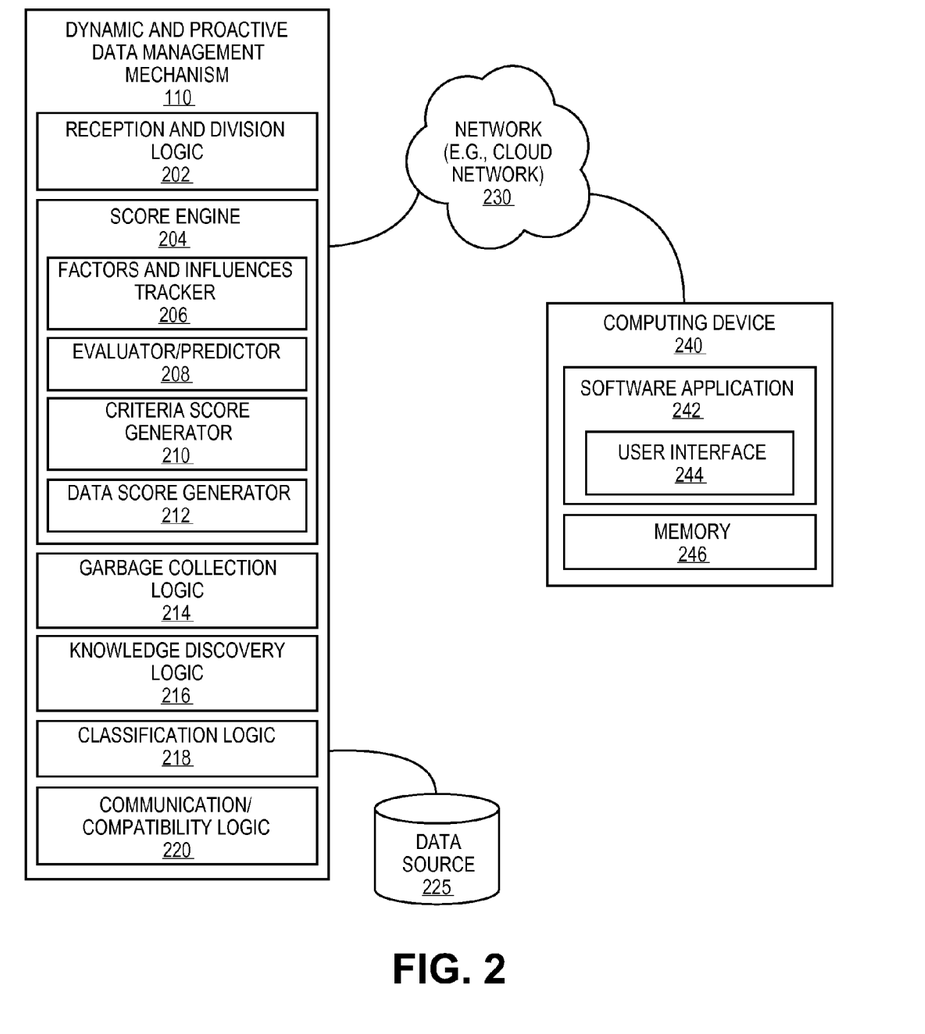
FIG. 2 illustrates a dynamic and proactive data management mechanism according to one embodiment.

FIG. 2 illustrates a dynamic and proactive data management mechanism 110 according to one embodiment. In one embodiment, dynamic and proactive data management mechanism ("proactive data mechanism") 110 may include a number of components, such as: reception and division logic 202; scores engine 204 including context/usage factors and knowledge discovery influences tracker ("factors and influences tracker") 206, evaluator/predictor 208, criteria score generator 210, and data score generator 212; garbage collection logic 214; knowledge discovery logic 216; classification logic 218; and communication/compatibility logic 220. As illustrated, proactive data mechanism 110 may be hosted at a host machine, such as computing device 100 of FIG. 1, and be in communication with one or more backend data source 225, such as database, raw files, distributed file system and cloud storage, etc., and one or more computing devices, such as computing device 240 (e.g., client computing device, such as a mobile computing device, such as a smartphone, a tablet computer, a laptop computer, etc.), over one or more networks, such as network 230 (e.g., cloud network, the Internet, proximity network, such as Bluetooth, etc.).

Computing device 240 may employ one or more software applications, such as software application 242 (e.g., business application, website, etc.) offering one or more user interfaces, such as user interface 244 (e.g., web user interface (WUI), graphical user interface (GUI), touchscreen, etc.). Computing device 240 may further include one or more local storage devices and/or memory, such as memory 246, for storing and caching data.

In one embodiment, reception logic 202 may be used to receive newly arrived data that may then be added to any existing data, such as data at data source 225. This new data may then be forwarded on to garbage collection logic 214 for further processing. For example, at garbage collection logic 214, the new data may be divided into generations of data objects, such as garbage collection methods in managed run-time languages (e.g., Java®), and may then actively sweep the data objects, such as short-life-cycle data, out-of-date data, low entropy data, etc., from the top generation to the bottom generation by comparing a criteria score with a data score as generated by criteria score generator 210 and data score generator 212, respectively, at scores engine 204. As will be further described below, in one embodiment, a score may be a number or a range of numbers representing the criteria for garbage collection logic 214 and knowledge discovery logic 216 to consider when processing the data.

For example, smaller data sets may be used for processing by garbage collection logic 214 based on the score, such as which of the data sets may be of greater interest to a user versus other data sets that might not be of equal interest to the user. In one embodiment, if the value or score associated with any of the data sets is below the criteria score, the data sets are speculated as low interest data by garbage collection logic 214 and are sent to classification logic 218 where they are classified as, for example, "garbage data" for such data sets (e.g., tax documents, websites (e.g., IRS.com, etc.) or applications (e.g., TurboTax®) may not be as likely to be accessed by the user in the month of September, etc.) carry low importance and thus are less likely to be access by the user at computing device 240. The rest of the data sets, which are ranked at or within or above the score, may then be forwarded on to knowledge discovery logic 216 for additional processing.

In one embodiment, using the criteria score, knowledge discovery logic 216 speculates the future use of the remaining/received data sets of the new data and in this case, if the score calculated and associated with any of the data sets is found to be above the criteria score and such data sets are determined most likely to be used by the user (e.g., work-related/business application, news websites (e.g., NYTimes.com, etc.), etc., that are accessed and used by the user on a daily-basis) are sent to classification unit 218 to be classified as "normal data". Similarly, if the score associated with any of the data sets matches the criteria score or is found to be within the criteria score range, such data sets are send to classification logic 218 to be classified as "knowledge data".

Throughout this document, terms like "logic", "component", "module", "framework", "engine", and the like, may be referenced interchangeably and include, by way of example, software, hardware, and/or any combination of software and hardware, such as firmware. Further, any use of a particular brand, word, or term, such as "garbage data", "normal data", "knowledge data", "knowledge discovery", "new data score", "criteria score", "score", "CRM", etc., should not be read to limit embodiments to software or devices that carry that label in products or in literature external to this document.

In one embodiment, any new and/or existing data is continuously, and in run-time, received at reception and division logic 202 where the data is not only received but also divided, in run-time, into data sets or objects for further processing. These data sets may then be offered to scores engine 204 for further processing. At scores engine 204, in one embodiment, based on any number and type of context/usage factors, factors and influences tracker 206 may be used to continuously, and in run-time, track the context and use relating to the data sets received from reception and division logic 202. Some examples of such context/usage factors associated with various data sets may include timestamp (e.g., when (e.g., date and time) a data set was accessed, such as a photo on Facebook®), viewing frequency (e.g., how often and when a data set was viewed, such as an email in Outlook®, etc.), reviewing/changing frequency (e.g., how often and when a dataset of reviewed or altered after being initially viewed, such as tax document for a client), forwarding frequency (e.g., how often an item was forwarded to or posted for others, such as an accounting file sent (e.g., company email) to or posted (e.g., company website or intranet) for other members of the accounting department, etc. Further, these factors may be considered, used, added, deleted, modified, etc., automatically as preset by a system administrator based on any number and type of knowledge discovery influences, such as user preferences and/or real-time requests, data sets content relevance, time relevance (e.g., weekends versus weekdays, etc.), data importance (e.g., work email versus personal email, etc.), user history, data history, or the like. In one embodiment, knowledge discovery influences may also be tracked by factors and influences tracker 206. It is contemplated that embodiments are not limited to the aforementioned context/usage factors and/or influences and that any number and type of factors and/or influences may be used, as desired or necessitated.

In one embodiment, the data sets along with the tracked factors and/or influences are then received at evaluator/predictor 208 where they are further evaluated so that the use of each of the data sets may be intelligently, and in real-time, predicted or speculated. In one embodiment, each of the factors and influences may be assigned a numerical weight which may then be fed into an equation to be able to intelligently speculate the potential of user access of each of the data sets. For example, the user's work email may be assigned a higher weight during work hours than the entries being made in the user's account at a social networking website. However, these weights may be reversed during vacation, evening hours, weekends, etc. However, if, for example, during summer months, the user uses her Facebook account even during work hours to obtain current status of her kids at home, then this particular account may be given a higher weight. This may either be explicitly requested by the user, such as via user interface 244 of software application 242 at computing device 240, or dynamically and automatically tracked, in real-time, by factors and influences tracker 206 and provided to evaluator/predictor 208.

In one embodiment, the context/usage factors and the knowledge discovery influences along their corresponding weights forwarded on to criteria score generator 210 and data score generator 212 so that relevant scores may be generated. A criteria score may be regarded as a policy score that may be based on a policy, where the policy may be determined based on a number of policy factors (e.g., administrative, legal, technical, etc.), such as within a company, any access to social networking websites or inappropriate contents at company computing devices may be restricted or completely forbidden and thus any relevant data sets may be assigned a low weight even if an employ may wish to access them. For example, social network websites or streaming videos, etc., may be restricted for technical reasons, such as to avoid any unnecessary or personal traffic occupying the company bandwidth. Similarly, for example, any inappropriate contents may be restricted for administrative or legal factors to avoid any potential personnel problems and/or lawsuits, etc. These criteria may be different on a user's personal computing device where the user may be permitted to access some or all of the data that may be restricted and/or forbidden at the company's computing devices.

Considering any number and type of the aforementioned policy factors, such as system limitations/bandwidth, subject sensitivity, etc., along with any context/usage factors and knowledge discovery influences, an authorized user (e.g., system administrator) may form a policy which may then be applied selectively or across the board. For example, certain data of high importance (e.g., company financial status) or sensitive nature (e.g., legal documents) may be made available to particular individual (e.g., corporate lawyer, central financial officer (CFO), etc.) or departments (legal, financial, human resources, etc.) that may not be accessed or even known by other individuals (e.g., receptionist, sales manager, etc.). The applied policy is referred to and considered by criteria score generator to calculate a criteria score, including a number (e.g., 5) or a range of numbers (e.g., 4-6), to reflect the minimum criteria or policy for any data sets to be classified as garbage data, normal data, or knowledge data.

Similarly, in one embodiment, data score generator 212 use any relevant context/usage factors and knowledge discovery influences and their associated weights to generate a data score relating to each data set that may then be used to rate the data set to determine its classification. It is contemplated that as with the policy for generating criteria score, any form of process or calculating method, such as an equation, may be employed to calculate data scores. For example, an equation may be used to calculate the data score, such as data score=$c*m+v*n+f*n+r*o+score\_prev$, where c refers to timestamp, v refers to viewing frequency, f refers to forwarding frequency, r refers to reviewing/changing times. Similarly, variables m, n, n, and o may indicate the weights assigned to each context/usage factor based on its corresponding knowledge discovery influence. For example, timestamp (c) may be assigned a higher weight then some of the other factors when a data set is time-sensitive, such as a file that needs to be submitted by a deadline. In the above example, factors v and f are assigned the same weight, n, indicating that not weights have to be different and that the same weight may be associated with any number and type of factors.

In one embodiment, the calculation process, such as the equation above, may be applied to all data sets, via data score generator 212, so that a corresponding data score may be generated for each of the data sets. In some embodiments, multiple criteria score equations may be used to calculate multiple criteria scores (such as to be applied selectively) and similarly, multiple data score equations may be used to calculate multiple criteria scores (such as calculating a quick data score as opposed to an in-depth data score, etc.). For example, similar to minor-garbage collection and major-garbage collection in run-time languages, a shallow or minor data score equation may be used to calculate quick/shallow data scores, but a more in-depth or major data score equation may be used to determine relatively detailed and accurate data scores.

For example, some of the in-depth calculations may use additional context/usage functions and/or knowledge discovery influences, such as word segmentation, keyword extraction, correlation calculation, etc. Further, it is contemplated that scores engine 204 may function continuously, and in run-time, to continuously evaluate the new and existing data and produce, in run-time, criteria scores and/or data scores. Similarly, other processes, such as score comparisons by garbage collection logic 214 and knowledge discovery logic 216, classifications by classification logic 218, etc., may also be performed continuously and in-time. Further, given that these processes may be performed continuously and in-time, they are also performed concurrently with the user accessing, viewing, and/or using any number and type of data sets at computing device 240.

In one embodiment, garbage collection logic 214 receives the data sets and criteria and data scores from scores engine 204 where the data sets are actively evaluated and swept into their appropriate generation. It is to be noted that terms like "generation", "category", "class", "classification", and the like, may be used interchangeably throughout the document. For example and as aforementioned, multiple generations or classifications (e.g., knowledge data, normal data, garbage data, etc.) may be created and maintained for data sets such that the generations may act as multi-level or hierarchical cache. For example, an upper generation may be smaller than a lower generation, such as knowledge may be smaller than normal, where normal may be smaller than garbage and similarly, a high speed storage may be used for top generations, such as the highest speed storage may be used for knowledge data, and a low speed storage may be used for low generations, such as the lowest speed storage may be used for garbage data. Further, in one embodiment, any misses in upper generations may automatically generate accesses into lower generations to provide additional efficiency in the use and maintenance of cache, such as knowledge data may be small but relevant where garbage data may be large but irrelevant.

Referring back to garbage collection logic 214, a comparison process may be performed where the data score associated with each data set is compared to or matched with the criteria score and depending on the result, a proactive sweep of the data sets is performed. In one embodiment, if a data score (e.g., 2) associated with a data set (e.g., family photos, music, etc.) is lower than the criteria score (e.g., 5) or the criteria score range (e.g., 4-6), the data set is determined to have failed to meet the minimum criteria and is associated with garbage generation and/or classified as garbage data/data sets via classification logic 218. All data sets classified as garbage data may be swept away and kept at one or more local or remote storage devices or server-side databases, such as data source 225, where they are speculated to be seldom accessed by the user. Any data sets with data scores that are the same as or greater than the criteria score are pushed to knowledge discovery logic 216 for further processing.

At knowledge discovery logic 216, in one embodiment, another comparison process is performed to compare the data scores associated with the data sets received from garbage collection logic 214 to the criteria score. Any data sets (e.g., personal email, such as Gmail®) of data scores (e.g., 5) equal to the criteria score (e.g., 5) or within the criteria score range (e.g., 4-6) are associated with normal generation and/or classified as normal data/data sets via classification logic 218. These normal data sets may be place in one or more storage devices or databases that are medium-level, medium-speed, etc., where the data sets are speculated not to be accessed immediately and/or frequently, but may be predicted to be accessed more immediately and/or frequently than the garbage data. Any data sets (e.g., work email, such as Outlook®, business software applications, etc.) of data scores (e.g., 9) higher than the criteria score (e.g., 5) and the criteria score range (e.g., 4-6) are classified as associated with knowledge generation and/or classified as knowledge data/data sets via classification logic 218. In one embodiment, the knowledge data, being the most relevant may be speculated to be used immediately and/or frequently and may be stored at a fast and efficient local storage device or memory, such as memory 246, such that the knowledge data may be instantly cached for the user to access using computing device 240.

In some embodiments, garbage collection process by garbage collection logic 214 and/or knowledge discovery process by knowledge discovery logic 216 may be performed in real-time which may be continuously or periodically as preset by an administrative user (e.g., system administrator, database administrator, software developer, etc.), such as every hour or every day, etc., or upon detection of an event, such as reaching a limit on generation size as predefined by the administrative user, database size, system bandwidth size, etc.

Communication/compatibility logic 220 may be used to facilitate dynamic communication and compatibility between various computing devices, such as host machine 100 of FIG. 1, and computing device 240 (e.g., client computing device, such as a mobile computing device, a desktop computer, etc.), storage devices, databases and/or data sources, such as data source 225, networks, such as network 230 (e.g., cloud network, the Internet, intranet, proximity networks, such as Bluetooth, Bluetooth low energy (BLE), Bluetooth Smart, Wi-Fi proximity, Radio Frequency Identification (RFID), Near Field Communication (NFC), etc.), connectivity and location management techniques (e.g., Common Connectivity Framework (CCF) by Intel®, etc.), software applications/websites, (e.g., social networking websites, such as Facebook®, LinkedIn®, Google+®, etc., business applications, games and other entertainment applications, etc.), programming languages, etc., while ensuring compatibility with changing technologies, parameters, protocols, standards, etc.

It is contemplated that any number and type of components may be added to and/or removed from proactive data mechanism 110 to facilitate various embodiments including adding, removing, and/or enhancing certain features. For brevity, clarity, and ease of understanding of proactive data mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3:
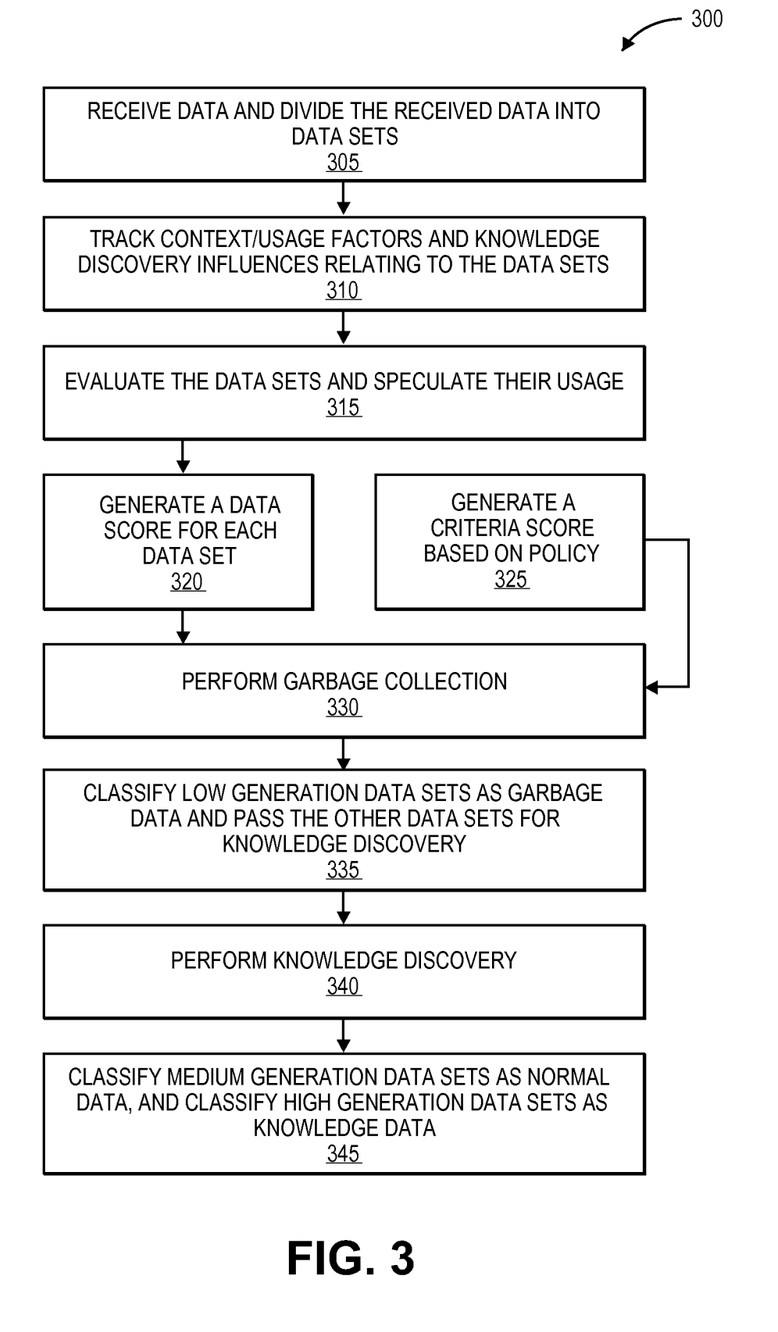
FIG. 3 illustrates a method for facilitating dynamic and proactive data management for computing devices according to one embodiment.

FIG. 3 illustrates a method 300 for facilitating dynamic and proactive data management for computing devices according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed by proactive data mechanism 110 of FIG. 1.

Method 300 begins at block 305 with receiving newly arrived and/or existing data and dividing the data into any number and type of relevant data sets. At block 310, various context/usage factors (e.g., timestamp, viewing frequency, etc.) and knowledge discovery influences (e.g., content relevancy, time relevancy, etc.) relating to the data sets are tracked. At block 315, the data sets are evaluated and their usage is speculated based on the tracked factors and influences. At block 320, in one embodiment, based on the evaluation and speculation of the data sets, data scores are generation where each data set is assigned a data score indicating its relevance, importance, and/or speculated usage, etc.

In one embodiment, at block 325, a criteria score may be generated based on a policy. For example, as aforementioned, a system administrator may take into consideration any number of administrative (e.g., legal issues, etc.) and technical factors (e.g., bandwidth limitations, etc.) to form a criteria policy which may then be assigned a numeric value, such as a number or a range, and referred to as criteria score. This criteria score may be used as the barometer for filtering through and assigning classifications to the data sets.

At block 330, in one embodiment, garbage collection is performed to filter through the data sets by comparing their data scores with the criteria score. At block 335, all those data sets that are found to have data scores below the criteria score are swept to the lowest garbage generation and classified as garbage data. The rest of the data sets are passed on for knowledge discovery. At block 340, knowledge discovery of the remaining data sets is performed. At block 345, all those data sets whose data scores match the criteria score or fall within the criteria score range are moved to the middle normal generation and classified as normal data. Other data sets having data scores higher than the criteria score are sent to the highest knowledge generation and classified as knowledge data. As aforementioned, in one embodiment, the knowledge data, compared to the normal data and the garbage data, is regarded as more relevant and speculated to have greater and/or immediate usage which can be immediately cached and provided for the user to access. Similarly, the normal data is regarded as more pertinent and accessible than the garbage data which is put away for its low or lack of relevance and accessibility.

It is contemplated that any set of processes, such as execution sequences of block 330, 335 to 340 may be interchanged or run in parallel. For example, garbage collection may be performed or executed before or after knowledge discovery. In some embodiments, garbage collection and knowledge discovery may be performed in parallel, where the data sets are classified to generations based on criteria scores.

Figure 4:
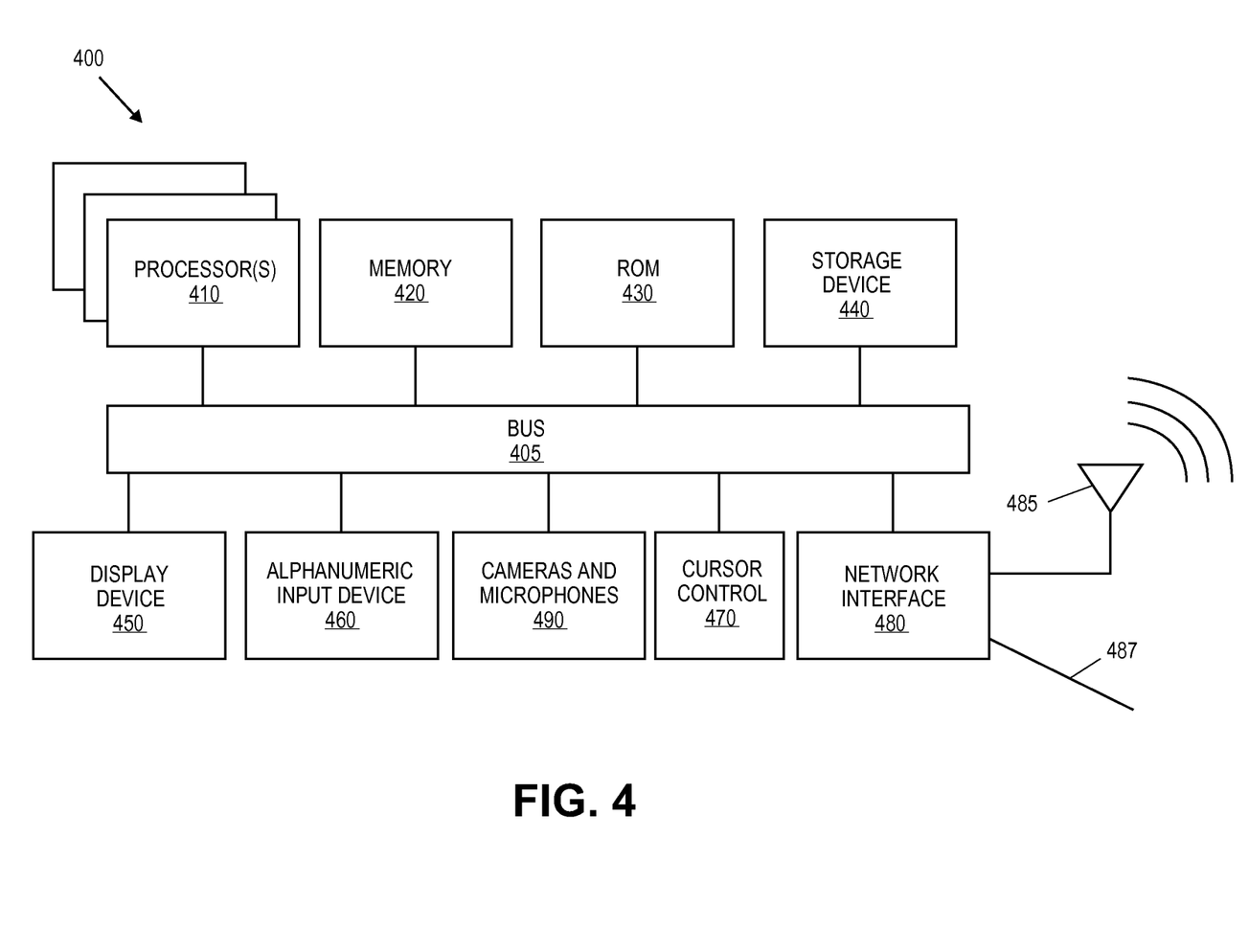
FIG. 4 illustrates computer system suitable for implementing embodiments of the present disclosure according to one embodiment.

FIG. 4 illustrates an embodiment of a computing system 400. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components. Computing device 400 may be the same as or similar to or include host machine 100, employing proactive data mechanism 110, of FIG. 1 and/or client computing device 240 of FIG. 2.

Computing system 400 includes bus 405 (or a link, an interconnect, or another type of communication device or interface to communicate information) and processor 410 coupled to bus 405 that may process information. While computing system 400 is illustrated with a single processor, electronic system 400 and may include multiple processors and/or co-processors, such as one or more of central processors, graphics processors, and physics processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, a touchscreen, a touchpad, or cursor direction keys to communicate direction information and command selections to processor 410 and to control cursor movement on display 450. Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Some embodiments pertain to a method comprising: tracking one or more factors relating to a plurality of data sets; evaluating the plurality of data sets based on the one or more factors, wherein evaluating includes speculating at least one of relevancy and accessibility of each of the plurality of data sets; generating data scores, wherein the data scores are associated with the plurality of data sets based on the evaluation of the plurality of data sets; performing a first comparison of the data scores of the plurality of data sets with a criteria score; and classifying each data set based on the first comparison, wherein classifying includes setting caching order for each data set of the plurality of data sets.

Embodiments or examples include any of the above methods wherein the one or more factors comprise one or more of timestamp, viewing frequency, reviewing frequency, modification frequency, and forwarding frequency.

Embodiments or examples include any of the above methods wherein tracking comprises tracking one or more influences relating to the plurality of data sets, wherein the one or more influences comprise one or more of user preferences, user real-time requests, data relevance, data importance, time relevance, user history, and data history.

Embodiments or examples include any of the above methods wherein the first comparison comprises detecting one or more of a first set of data scores of the data scores below the criteria score, a second set of data scores of the data scores equal to the criteria score, and a third set of data scores of the data scores above the criteria score.

Embodiments or examples include any of the above methods wherein the first comparison further comprises identifying a first data set of the plurality of data sets associated with the first set of data, wherein the first data set is classified as a garbage data set and associated with a low generation including a garbage generation, wherein the low generation represents low relevancy or low accessibility of contents of the second data set.

Embodiments or examples include any of the above methods further comprising performing a second comparison of the second set of data scores and the third set of data scores with the criteria score, wherein the second comparison comprises identifying a second data set of the plurality of data sets associated with the second set of data scores, and a third data set of the plurality of data sets associated with the second set of data scores.

Embodiments or examples include any of the above methods wherein the second data set is classified as a normal data set and associated with a medium generation including a normal generation, wherein the medium generation represents medium relevancy or medium accessibility of contents of the second data set, and wherein the third data set is classified as a knowledge data set and associated with a high generation including a knowledge generation, wherein the high generation represents high relevancy or high accessibility of contents of the third data set.

Embodiments or examples include any of the above methods further comprising generating the criteria score based on one or more policies, wherein the criteria score is assigned a numerical value including a number or a range.

Embodiments or examples include any of the above methods further comprising receiving data, wherein the data is divided into the plurality of data sets, wherein the data includes new data or existing data.

Another embodiment or example includes an apparatus to carry out operations according to any of the methods mentioned above.

In another embodiment or example, an apparatus comprises means for carrying out operations according to any of the methods mentioned above.

In yet another embodiment or example, a computing device arranged to carry out operations according to any of the methods mentioned above.

In yet another embodiment or example, a communications device arranged to carry out operations according to any of the methods mentioned above.

In one embodiment or example, a system comprises a mechanism to carry out operations according to any of the methods mentioned above.

In yet another embodiment or example, at least one machine-readable storage medium comprising a plurality of instructions that in response to being executed on a computing device, causes the computing device to carry out operations according to any of the methods mentioned above.

In yet another embodiment or example, at least one non-transitory or tangible machine-readable storage medium comprising a plurality of instructions that in response to being executed on a computing device, causes the computing device to carry out operations according to any of the methods mentioned above.

Some embodiments pertain to an apparatus comprising: context/usage tracker to track one or more factors relating to a plurality of data sets; evaluator/predictor to evaluate the plurality of data sets based on the one or more factors, wherein evaluating includes speculating at least one of relevancy and accessibility of each of the plurality of data sets; data score generator to generate data scores, wherein the data scores are associated with the plurality of data sets based on the evaluation of the plurality of data sets; garbage collection logic to perform a first comparison of the data scores of the plurality of data sets with a criteria score; and classification logic to classify each data set based on the first comparison, wherein classifying includes setting caching order for each data set of the plurality of data sets.

Embodiments or examples include the above apparatus wherein the context/usage tracker is further to track one or more influences relating to the plurality of data sets.

Embodiments or examples include the above apparatus wherein the one or more factors comprise one or more of timestamp, viewing frequency, reviewing frequency, modification frequency, and forwarding frequency, and wherein the one or more influences comprise one or more of user preferences, user real-time requests, data relevance, data importance, time relevance, user history, and data history.

Embodiments or examples include the above apparatus wherein the first comparison comprises detecting one or more of a first set of data scores of the data scores below the criteria score, a second set of data scores of the data scores equal to the criteria score, and a third set of data scores of the data scores above the criteria score Embodiments or examples include the above apparatus wherein the garbage collection logic is further to identify a first data set of the plurality of data sets associated with the first set of data, wherein the first data set is classified as a garbage data set and associated with a low generation including a garbage generation, wherein the low generation represents low relevancy or low accessibility of contents of the second data set.

Embodiments or examples include the above apparatus further comprising knowledge discovery logic to perform a second comparison of the second set of data scores and the third set of data scores with the criteria score.

Embodiments or examples include the above apparatus wherein the knowledge discovery logic is further to identify a second data set of the plurality of data sets associated with the second set of data scores, and a third data set of the plurality of data sets associated with the second set of data scores.

Embodiments or examples include the above apparatus wherein the second data set is classified as a normal data set and associated with a medium generation including a normal generation, wherein the medium generation represents medium relevancy or medium accessibility of contents of the second data set.

Embodiments or examples include the above apparatus wherein the third data set is classified as a knowledge data set and associated with a high generation including a knowledge generation, wherein the high generation represents high relevancy or high accessibility of contents of the third data set.

Embodiments or examples include the above apparatus further comprising criteria score generator to generate the criteria score based on one or more policies, wherein the criteria score is assigned a numerical value including a number or a range.

Embodiments or examples include the above apparatus further comprising reception and division logic to receive data, wherein the reception and division logic is further to divide the data into the plurality of data sets, wherein the data includes new data or existing data.

Some embodiments pertain to a system comprising: a storage device having instructions, and a processor to execute the instructions to facilitate one or more operations comprising: tracking one or more factors relating to a plurality of data sets; evaluating the plurality of data sets based on the one or more factors, wherein evaluating includes speculating at least one of relevancy and accessibility of each of the plurality of data sets; generating data scores, wherein the data scores are associated with the plurality of data sets based on the evaluation of the plurality of data sets; performing a first comparison of the data scores of the plurality of data sets with a criteria score; and classifying each data set based on the first comparison, wherein classifying includes setting caching order for each data set of the plurality of data sets.

Embodiments or examples include the above system wherein the one or more factors comprise one or more of timestamp, viewing frequency, reviewing frequency, modification frequency, and forwarding frequency.

Embodiments or examples include the above system wherein tracking comprises tracking one or more influences relating to the plurality of data sets, wherein the one or more influences comprise one or more of user preferences, user real-time requests, data relevance, data importance, time relevance, user history, and data history.

Embodiments or examples include the above system wherein the first comparison comprises detecting one or more of a first set of data scores of the data scores below the criteria score, a second set of data scores of the data scores equal to the criteria score, and a third set of data scores of the data scores above the criteria score.

Embodiments or examples include the above system wherein the first comparison further comprises identifying a first data set of the plurality of data sets associated with the first set of data, wherein the first data set is classified as a garbage data set and associated with a low generation including a garbage generation, wherein the low generation represents low relevancy or low accessibility of contents of the second data set.

Embodiments or examples include the above system wherein the one or more operations further comprise performing a second comparison of the second set of data scores and the third set of data scores with the criteria score, wherein the second comparison comprises identifying a second data set of the plurality of data sets associated with the second set of data scores, and a third data set of the plurality of data sets associated with the second set of data scores.

Embodiments or examples include the above system wherein the second data set is classified as a normal data set and associated with a medium generation including a normal generation, wherein the medium generation represents medium relevancy or medium accessibility of contents of the second data set, and wherein the third data set is classified as a knowledge data set and associated with a high generation including a knowledge generation, wherein the high generation represents high relevancy or high accessibility of contents of the third data set.

Embodiments or examples include the above system wherein the one or more operations further comprise generating the criteria score based on one or more policies, wherein the criteria score is assigned a numerical value including a number or a range.

Embodiments or examples include the above system wherein the one or more operations further comprise receiving data, wherein the data is divided into the plurality of data sets, wherein the data includes new data or existing data.

Some embodiments pertain to an apparatus comprising: means for tracking one or more factors relating to a plurality of data sets; means for evaluating the plurality of data sets based on the one or more factors, wherein evaluating includes speculating at least one of relevancy and accessibility of each of the plurality of data sets; means for generating data scores, wherein the data scores are associated with the plurality of data sets based on the evaluation of the plurality of data sets; means for performing a first comparison of the data scores of the plurality of data sets with a criteria score; and means for classifying each data set based on the first comparison, wherein classifying includes setting caching order for each data set of the plurality of data sets.

Embodiments or examples include the above apparatus wherein the one or more factors comprise one or more of timestamp, viewing frequency, reviewing frequency, modification frequency, and forwarding frequency.

Embodiments or examples include the above apparatus wherein tracking comprises tracking one or more influences relating to the plurality of data sets, wherein the one or more influences comprise one or more of user preferences, user real-time requests, data relevance, data importance, time relevance, user history, and data history.

Embodiments or examples include the above apparatus wherein the first comparison comprises detecting one or more of a first set of data scores of the data scores below the criteria score, a second set of data scores of the data scores equal to the criteria score, and a third set of data scores of the data scores above the criteria score.

Embodiments or examples include the above apparatus wherein the first comparison further comprises identifying a first data set of the plurality of data sets associated with the first set of data, wherein the first data set is classified as a garbage data set and associated with a low generation including a garbage generation, wherein the low generation represents low relevancy or low accessibility of contents of the second data set.

Embodiments or examples include the above apparatus further comprising means for performing a second comparison of the second set of data scores and the third set of data scores with the criteria score, wherein the second comparison comprises identifying a second data set of the plurality of data sets associated with the second set of data scores, and a third data set of the plurality of data sets associated with the second set of data scores.

Embodiments or examples include the above apparatus wherein the second data set is classified as a normal data set and associated with a medium generation including a normal generation, wherein the medium generation represents medium relevancy or medium accessibility of contents of the second data set, and wherein the third data set is classified as a knowledge data set and associated with a high generation including a knowledge generation, wherein the high generation represents high relevancy or high accessibility of contents of the third data set.

Embodiments or examples include the above apparatus further comprising means for generating the criteria score based on one or more policies, wherein the criteria score is assigned a numerical value including a number or a range.

Embodiments or examples include the above apparatus further comprising means for receiving data, wherein the data is divided into the plurality of data sets, wherein the data includes new data or existing data.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
a hardware processing device;
context/usage tracker to track one or more factors relating to a plurality of data sets;
evaluator/predictor to evaluate the plurality of data sets based on the one or more factors, wherein evaluating includes speculating at least one of relevancy and accessibility of each of the plurality of data sets;
data score generator to generate data scores and criteria scores, wherein the data scores are associated with the plurality of data sets based on the evaluation of the plurality of data sets, wherein the criteria scores are based on policies relating to the plurality of data sets;
garbage collection logic to perform a first comparison of the data scores of the plurality of data sets with a criteria score;
classification logic to classify each data set based on the first comparison, wherein classifying includes setting caching order for each data set of the plurality of data sets such that low generation data sets are classified as garbage data, while other data sets are passed for knowledge discovery, wherein the first comparison comprises detecting one or more of a first set of data scores of the data scores below the criteria score, a second set of data scores of the data scores equal to the criteria score, and a third set of data scores of the data scores above the criteria score; and
knowledge discovery logic to perform a second comparison of the second set of data scores and the third set of data scores with the criteria score.

2. The apparatus of claim 1, wherein the context/usage tracker is further to track one or more influences relating to the plurality of data sets.

3. The apparatus of claim 1, wherein the one or more factors comprise one or more of timestamp, viewing frequency, reviewing frequency, modification frequency, and forwarding frequency, and wherein the one or more influences comprise one or more of user preferences, user real-time requests, data relevance, data importance, time relevance, user history, and data history.

4. The apparatus of claim 1, wherein the garbage collection logic is further to identify a first data set of the plurality of data sets associated with the first set of data, wherein the low generation data sets represent low relevancy or low accessibility of contents of the second data set.

5. The apparatus of claim 1, wherein the knowledge discovery logic is further to identify a second data set of the plurality of data sets associated with the second set of data scores, and a third data set of the plurality of data sets associated with the second set of data scores.

6. The apparatus of claim 5, wherein the second data set is classified as a normal data set and associated with a medium generation including a normal generation, wherein the medium generation represents medium relevancy or medium accessibility of contents of the second data set.

7. The apparatus of claim 5, wherein the third data set is classified as a knowledge data set and associated with a high generation including a knowledge generation, wherein the high generation represents high relevancy or high accessibility of contents of the third data set.

8. The apparatus of claim 1, further comprising criteria score generator to generate the criteria score based on one or more policies, wherein the criteria score is assigned a numerical value including a number or a range.

9. The apparatus of claim 1, further comprising reception and division logic to receive data, wherein the reception and division logic is further to divide the data into the plurality of data sets, wherein the data includes new data or existing data.

10. A method comprising:
tracking, by a hardware processing device, one or more factors relating to a plurality of data sets;
evaluating, by the hardware processing device, the plurality of data sets based on the one or more factors, wherein evaluating includes speculating at least one of relevancy and accessibility of each of the plurality of data sets;
generating, by the hardware processing device, data scores and criteria scores, wherein the data scores are associated with the plurality of data sets based on the evaluation of the plurality of data sets, wherein the criteria scores are based on policies relating to the plurality of data sets;
performing, by the hardware processing device, a first comparison of the data scores of the plurality of data sets with a criteria score;
classifying, by the hardware processing device, each data set based on the first comparison, wherein classifying includes setting caching order for each data set of the plurality of data sets such that low generation data sets are classified as garbage data, while other data sets are passed for knowledge discovery, wherein the first comparison comprises detecting one or more of a first set of data scores of the data scores below the criteria score, a second set of data scores of the data scores equal to the criteria score, and a third set of data scores of the data scores above the criteria score; and
performing, by the hardware processing device, a second comparison of the second set of data scores and the third set of data scores with the criteria score, wherein the second comparison comprises identifying a second data set of the plurality of data sets associated with the second set of data scores, and a third data set of the plurality of data sets associated with the second set of data scores.

11. The method of claim 10, wherein tracking comprises tracking one or more influences relating to the plurality of data sets, wherein the one or more influences comprise one or more of user preferences, user real-time requests, data relevance, data importance, time relevance, user history, and data history, and
wherein the one or more factors comprise one or more of timestamp, viewing frequency, reviewing frequency, modification frequency, and forwarding frequency.

12. The method of claim 10, wherein the first comparison further comprises identifying a first data set of the plurality of data sets associated with the first set of data, wherein the low generation data sets represent low relevancy or low accessibility of contents of the second data set.

13. The method of claim 10, wherein the second data set is classified as a normal data set and associated with a medium generation including a normal generation, wherein the medium generation represents medium relevancy or medium accessibility of contents of the second data set, and
wherein the third data set is classified as a knowledge data set and associated with a high generation including a knowledge generation, wherein the high generation represents high relevancy or high accessibility of contents of the third data set.

14. The method of claim 10, further comprising:
generating, by the hardware processing device, the criteria score based on one or more policies, wherein the criteria score is assigned a numerical value including a number or a range; and
receiving, by the hardware processing device, data, wherein the data is divided into the plurality of data sets, wherein the data includes new data or existing data.

15. At least one non-transitory machine-readable medium comprising a plurality of instructions that in response to being executed on a computing device, causes the computing device to carry out one or more operations comprising:
tracking one or more factors relating to a plurality of data sets;
evaluating the plurality of data sets based on the one or more factors, wherein evaluating includes speculating at least one of relevancy and accessibility of each of the plurality of data sets;
generating data scores and criteria scores, wherein the data scores are associated with the plurality of data sets based on the evaluation of the plurality of data sets, wherein the criteria scores are based on policies relating to the plurality of data sets;
performing a first comparison of the data scores of the plurality of data sets with a criteria score;
classifying each data set based on the first comparison, wherein classifying includes setting caching order for each data set of the plurality of data sets such that low generation data sets are classified as garbage data, while other data sets are passed for knowledge discovery, wherein the first comparison comprises detecting one or more of a first set of data scores of the data scores below the criteria score, a second set of data scores of the data scores equal to the criteria score, and a third set of data scores of the data scores above the criteria score; and
performing a second comparison of the second set of data scores and the third set of data scores with the criteria score, wherein the second comparison comprises identifying a second data set of the plurality of data sets associated with the second set of data scores, and a third data set of the plurality of data sets associated with the second set of data scores.

16. The non-transitory machine-readable medium of claim 15, wherein tracking comprises tracking one or more influences relating to the plurality of data sets, wherein the one or more influences comprise one or more of user preferences, user real-time requests, data relevance, data importance, time relevance, user history, and data history, and
wherein the one or more factors comprise one or more of timestamp, viewing frequency, reviewing frequency, modification frequency, and forwarding frequency.

17. The non-transitory machine-readable medium of claim 15, wherein the first comparison further comprises identifying a first data set of the plurality of data sets associated with the first set of data, wherein the low generation data sets indicate low relevancy or low accessibility of contents of the second data set.

18. The non-transitory machine-readable medium of claim 15, wherein the second data set is classified as a normal data set and associated with a medium generation including a normal generation, wherein the medium generation represents medium relevancy or medium accessibility of contents of the second data set, and wherein the third data set is classified as a knowledge data set and associated with a high generation including a knowledge generation, wherein the high generation represents high relevancy or high accessibility of contents of the third data set.

19. The non-transitory machine-readable medium of claim 15 further comprising:

generating the criteria score based on one or more policies, wherein the criteria score is assigned a numerical value including a number or a range; and receiving data, wherein the data is divided into the plurality of data sets, wherein the data includes new data or existing data.

\* \* \* \* \*